(12) United States Patent
Hopkins, III

(10) Patent No.: US 8,359,045 B1
(45) Date of Patent: Jan. 22, 2013

(54) METHOD AND SYSTEM FOR WIRELESS DEVICE COMMUNICATION

(75) Inventor: John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1271 days.

(21) Appl. No.: 11/756,322

(22) Filed: May 31, 2007

(51) Int. Cl.
*H04W 24/00* (2009.01)

(52) U.S. Cl. ............... 455/456.3; 455/456.1; 455/456.5; 705/14.58; 705/14.66

(58) Field of Classification Search .... 455/414.1–414.3, 455/456.1–457, 466; 705/14.49–14.67
See application file for complete search history.

(56) References Cited

U.S. PATENT DOCUMENTS

| | | | |
|---|---|---|---|
| 5,729,697 A | 3/1998 | Schkolnick et al. | |
| 5,948,041 A | 9/1999 | Abo et al. | |
| 6,246,882 B1 | 6/2001 | Lachance | |
| 6,434,530 B1 | 8/2002 | Sloane et al. | |
| 6,442,530 B1 | 8/2002 | Miller | |
| 6,587,835 B1 | 7/2003 | Treyz et al. | |
| 6,912,507 B1 | 6/2005 | Phillips et al. | |
| 6,993,346 B2 | 1/2006 | Matsuyama | |
| 7,158,035 B2 | 1/2007 | Sakamoto et al. | |
| 7,518,511 B1 | 4/2009 | Panja et al. | |
| 2001/0041535 A1* | 11/2001 | Karmel | 455/12.1 |
| 2005/0136949 A1* | 6/2005 | Barnes | 455/461 |
| 2007/0013519 A1 | 1/2007 | Chung et al. | |
| 2007/0191026 A1 | 8/2007 | Teplitsky | |
| 2008/0171559 A1* | 7/2008 | Frank et al. | 455/456.5 |

OTHER PUBLICATIONS

"Benefits of Bluetooth Technology", [online]. (c)2007 Bluetooth SIG, Inc. [retrieved on May 16, 2007]. Retrieved from the Internet: <URL: http://www.bluetooth.com/Bluetooth/Learn/Benefits/>,2 pgs.
"Bluetooth", [online]. [retrieved on Apr. 2, 2007]. Retrieved from the Internet: <URL: http://en.wikipedia.org/wiki/BlueTooth>,12 pgs.
"Bluetooth Advertising—Transmitter Fact Sheet", (prior to May 16, 2007),1 pg.
"Bluetooth Advertising for Bluetooth Proximity Marketing", [online]. [retrieved on Apr. 2, 2007]. Retrieved from the Internet: <URL: http://www.bluetooth-advertising.co.uk/>,2 pgs.
"Bluetooth Framework 5.1.4", [online]. [retrieved on Apr. 2, 2007]. Retrieved from the Internet: <URL: http://www.fivesign.com/downloads/program/Bluetooth-Framework_138553_90.html>,2 pgs.
"Compare With Other Technologies", [online] (c)2007 Bluetooth SIG, Inc. [observed on May 16, 2007]. Retrieved from the Internet: <URL: http://www.bluetooth.com/Bluetooth/Learn/Technology/Compare/>,3 pgs.
"How Bluetooth Technology Works", [online]. (c)2007 Bluetooth SIG, Inc. [retrieved on May 16, 2007]. Retrieved from the Internet: <URL: http://www.bluetooth.com/Bluetooth/Learn/Works/>,2 pgs.
Rogge, M. , "heise Security Product—Bluetooth as Achilles' Heel", [online]. [retrieved on Apr. 2, 2007]. Retrieved from the Internet: <URL: http://www.heise-security.co.uk/articles/82496>,4 pgs.

* cited by examiner

*Primary Examiner* — Wesley Kim
*Assistant Examiner* — Marcus Hammonds
(74) *Attorney, Agent, or Firm* — Brooks, Cameron & Huebsch, PLLC

(57) ABSTRACT

A method, system and apparatus for wireless device communication. A wireless device may be engaged in a wireless data communication session within a local geographic region. The wireless device may be tracked within the local geographic region. The targeted information may be provided to the wireless device regarding the local geographic region based on the tracking of the wireless device.

6 Claims, 15 Drawing Sheets

METHOD AND SYSTEM FOR WIRELESS DEVICE COMMUNICATION

TECHNICAL FIELD

This application relates to a method and system for communication and more particularly to a method and system to provide information to wireless devices.

BACKGROUND

Wireless devices such as mobile phones communicate with other devices to provide data. Typically, the data is provided at the direction of an operator of the device to enable voice or data communication between the operator and a source. The type of data provided to wireless devices may be limited based on capabilities of the wireless device and/or an area in which the wireless device is operated.

SUMMARY

In an example embodiment, a wireless device may be engaged in a wireless data communication session in a local geographic region. The wireless device may be tracked within the local geographic region. Targeted information may be provided to the wireless device regarding the local geographic region based on the tracking of the wireless device.

In an example embodiment, a source transceiver may be engaged in a wireless data communication session in a local geographic region. Tracking information may be provided to the source transceiver while in the local geographic region. Targeted information may be received for a wireless device regarding the local geographic region based on the tracking of the wireless device. The targeted information may be displayed on the wireless device.

In an example embodiment, a user profile including a user criterion for an item type may be accessed. A plurality of item identifications may be wirelessly obtained from a plurality of items of the item type. A determination may be made whether at least one item of the plurality of items meets the user criterion based on the plurality of item identifications. A notification may be presented regarding the determination of whether the at least one item of the plurality of items meets the user criterion.

In an example embodiment, a plurality of item identifications may be wirelessly received from a plurality of hazardous materials in a plurality of defined areas. A hazardous materials query may be received. At least one item identification may be identified from the plurality of hazardous materials related to the hazardous materials query. The hazardous materials query may be responded to with the at least one item identification.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this invention.

Figure 1:
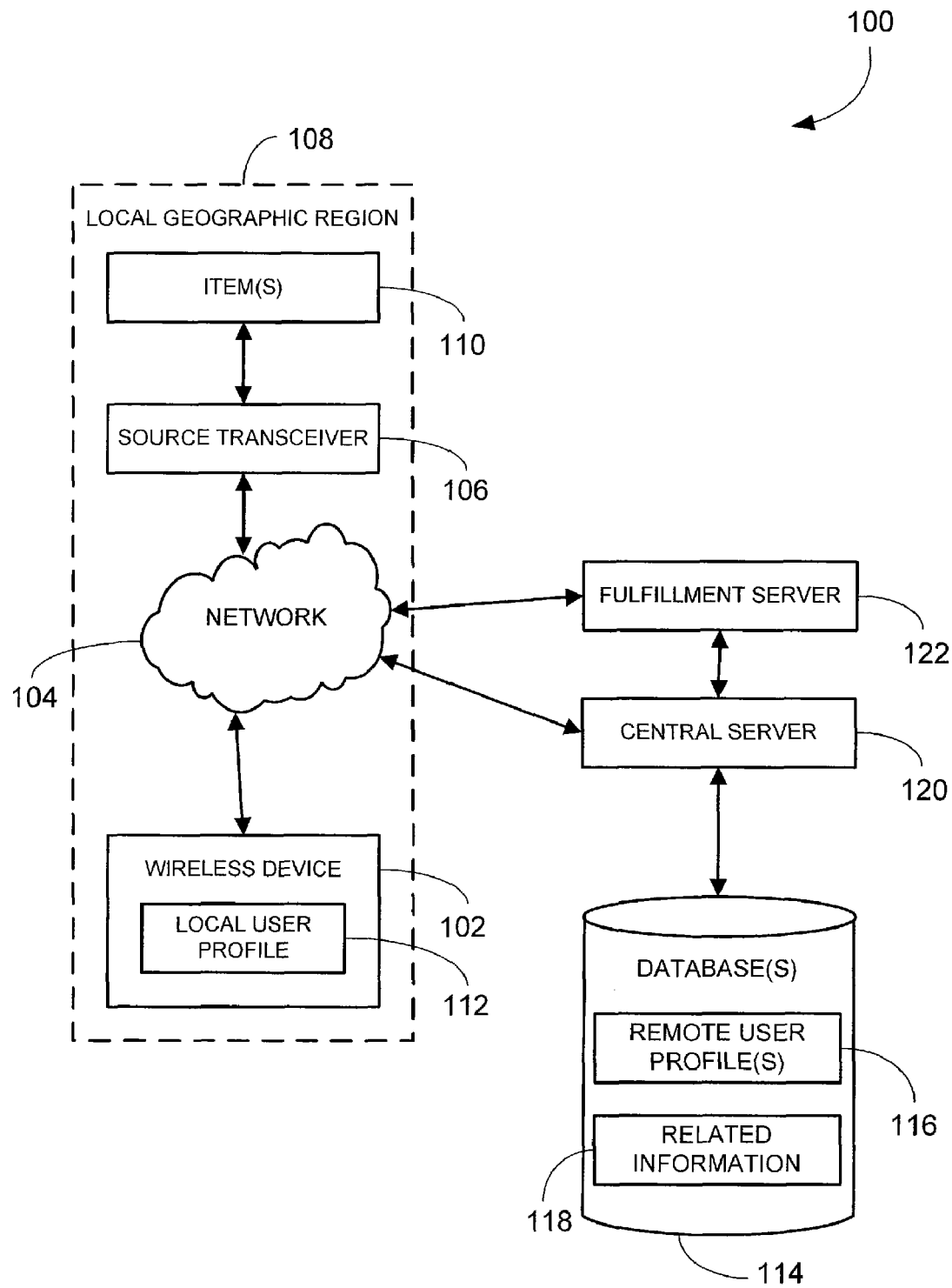
FIG. 1 is a block diagram of a system to perform wireless device communication according to an example embodiment.

FIG. 1 illustrates an example system 100 in which a wireless device 102 may communicate over a network 104 in a wireless data communication session with a source transceiver 106 located in a local geographic region 108. The wireless device 102 may be usable in a plurality of different geographic regions (not shown).

The wireless device 102 may be a mobile phone, a personal digital assistant (PDA), a MP3 player, a laptop computer, or other wireless device and may include an optional display. The wireless device 102 may include a wireless receiver such as a BLUETOOTH device or 2.4 GHz industrial, scientific and/or medical band device to communicate with the source transceiver 106 and/or the central server 120. The wireless device may be capable of being tracked with an integrated GPS receiver and/or other devices (e.g., a gyroscope or a pedometer). The wireless device 102 may optionally include an RFID reader.

The network 104 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

While in the local geographic region 108, the wireless device 102 may be engaged in a wireless data communication session with the source transceiver 106 to provide tracking information. The source transceiver 106 may be a BLUE- TOOTH transceiver or other device capable of transmitting information regarding a plurality of items 110 in a local geographic region 108 (e.g. a store) to the wireless device 102. A single source transceiver 106 or multiple source transceivers 106 may be available in the local geographic region 108. For example, a single source transceiver 106 may be used in a store or a plurality of source transceivers 106 may be used in a number of sections (e.g., sporting goods and clothing) in the store, or a source transceiver 106 may be associated with a particular rack of items (e.g., clothing).

The local geographic region 108 may be a store, an area in a store, a museum, a zoo, an exhibit, or the like in which the source transceiver 106 may communicate with the wireless device 102. The local geographic region 108 may optionally be a short range to provide high availability for communications between the source transceiver 106 and the wireless device 102.

The source transceiver 106 may provide information regarding the local geographic region 108 to the wireless device 102 while in the local geographic region 108, or may optionally be associated with a plurality of items 110 to provide information regarding the items to the wireless device 102 while in the local geographic region 108. The source transceiver 106 may be a discoverable device that may listen for an inquiry request and profile a response. The user may be notified of the wireless data communication session on the wireless device 102, visually, audibly, through movement, or otherwise. The plurality of items 110 may include clothing, hazardous materials, art, animals, or any other type of item that may be found in the local geographic region 108. The wireless device 102 may be set to automatically receive data pushed out by the central server 120.

Information regarding the user of the wireless device 102 may be available locally on the wireless device from a local user profile 112 and/or remotely from a remote user profile 116. The user profiles 112, 116 may include information that may be used by the wireless device 102 such as an organization with which the user is associated.

The user profiles 112, 116 may optionally include a user criterion for an item type. The user criterion may be a size of an item, a color of an item, a price of an item, dimensions of an item, or membership in an organization. Other user criterion may also be used. For example, the user profile 112, 116 may indicate that a user wears a particular size shirt and likes particular colors of shirts.

The remote user profile 116 and related information 118 may be stored in a database 114 and made available over the network 104 through use of a central server. The related information 118 may describe the relation between items. For example, the related information 118 may provide that a user interested in a speaker for a sound system may also seek speaker wire. The related information 118 may include other comparable products that are available, or other locations where the product may be purchased. The related information 118 may also identify places where an item may be purchased, information about the company, and the like.

In an example embodiment, a request for information regarding a product in the local geographic region may be received and targeted information may be provided to the device regarding the product based on the tracking of the device in response to receiving the request.

The central server 120 may be located inside or outside of the local geographic region 108 and may provide information from the remote user profile 116 and/or the related information 118.

An optional fulfillment server 122 may receive and process fulfillment requests received from the wireless device 102. For example, the fulfillment server 122 may enable a user to purchase an item using the wireless device 102.

Figure 2:
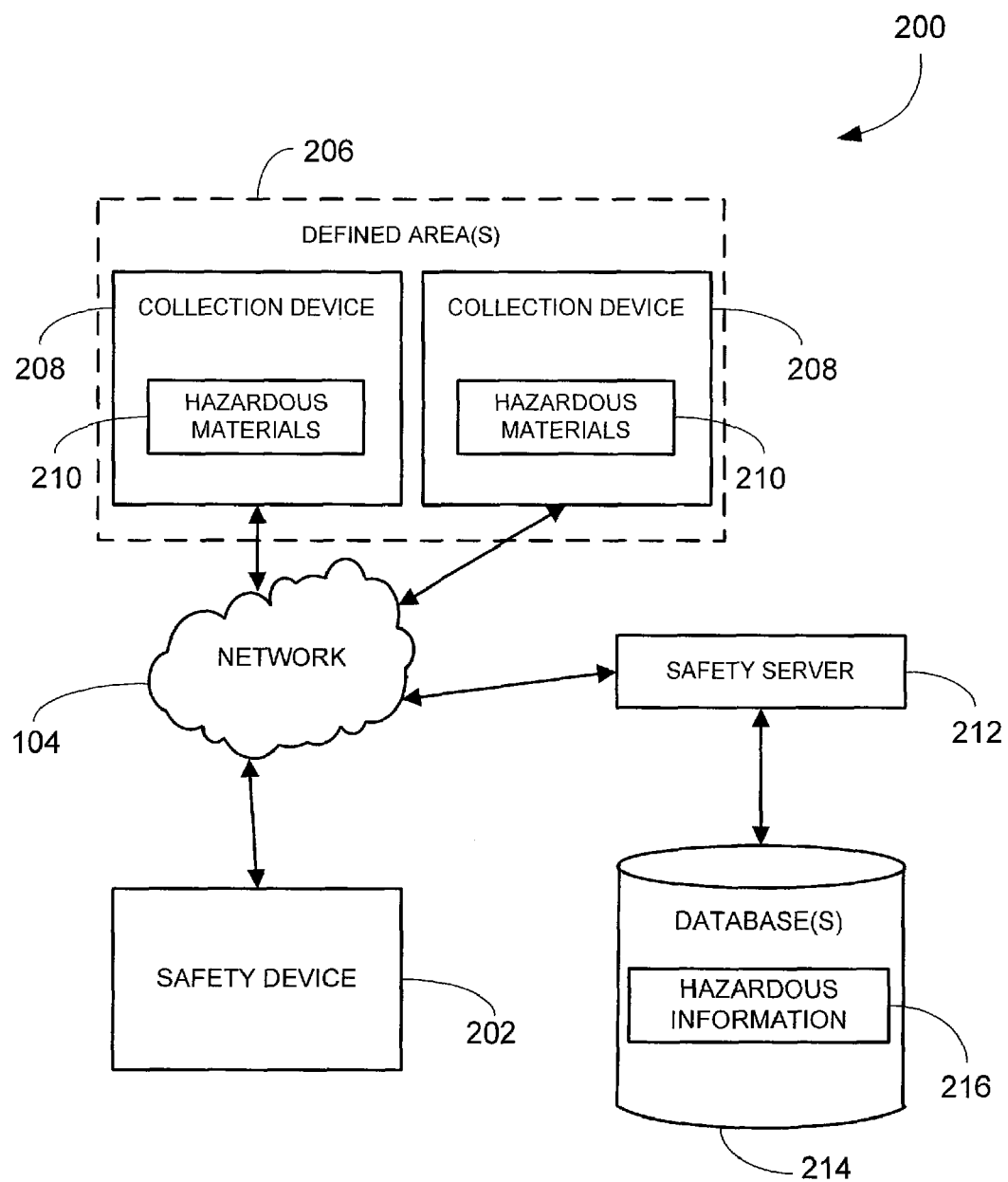
FIG. 2 is a block diagram of an example safety system.

FIG. 2 illustrates an example safety system 200 in which a safety sever 212 may be in communication over the network 104 with a plurality of collection devices 208 in one or more defined areas 206 and a safety device 202. The safety system 200 may be deployed in the system 100 (see FIG. 1) or in another system.

The safety device 202 may be a safety helmet worn or other safety device (e.g., a radiation sensor) used by a safety person (e.g. a fireman) to make hazardous material queries to the safety server 212 regarding a plurality of device areas 206. The hazardous materials or dangerous goods hazardous material may include items that are radioactive, flammable, explosive, toxic, corrosive, biohazardous, an oxidizer, an asphyxiant, an allergen, or may have other characteristics that make it hazardous in specific circumstances. The safety devices 202 may optionally include a display and/or include the functionality of the wireless devices 102 (see FIG. 1).

The safety server 212 may receive hazardous materials information from the plurality of defined areas 206 and optionally store the information as hazardous information in a database 214. The plurality of defined areas 206 may be located in a local geographic region 108 or among a plurality of local geographic regions 108.

Safety information may be provided wirelessly through the network 104 to the safety server 212 from a plurality of transceivers associated with the plurality of hazardous materials 210 or one or more transceivers associated with a collection device 208 in which the plurality of hazardous materials 210 are located. The collection devices 208 may include a safety closet and/or a confinement area. The safety closet may be a Hazmat locker or other item collection resource where hazardous materials may be kept.

Figure 3:
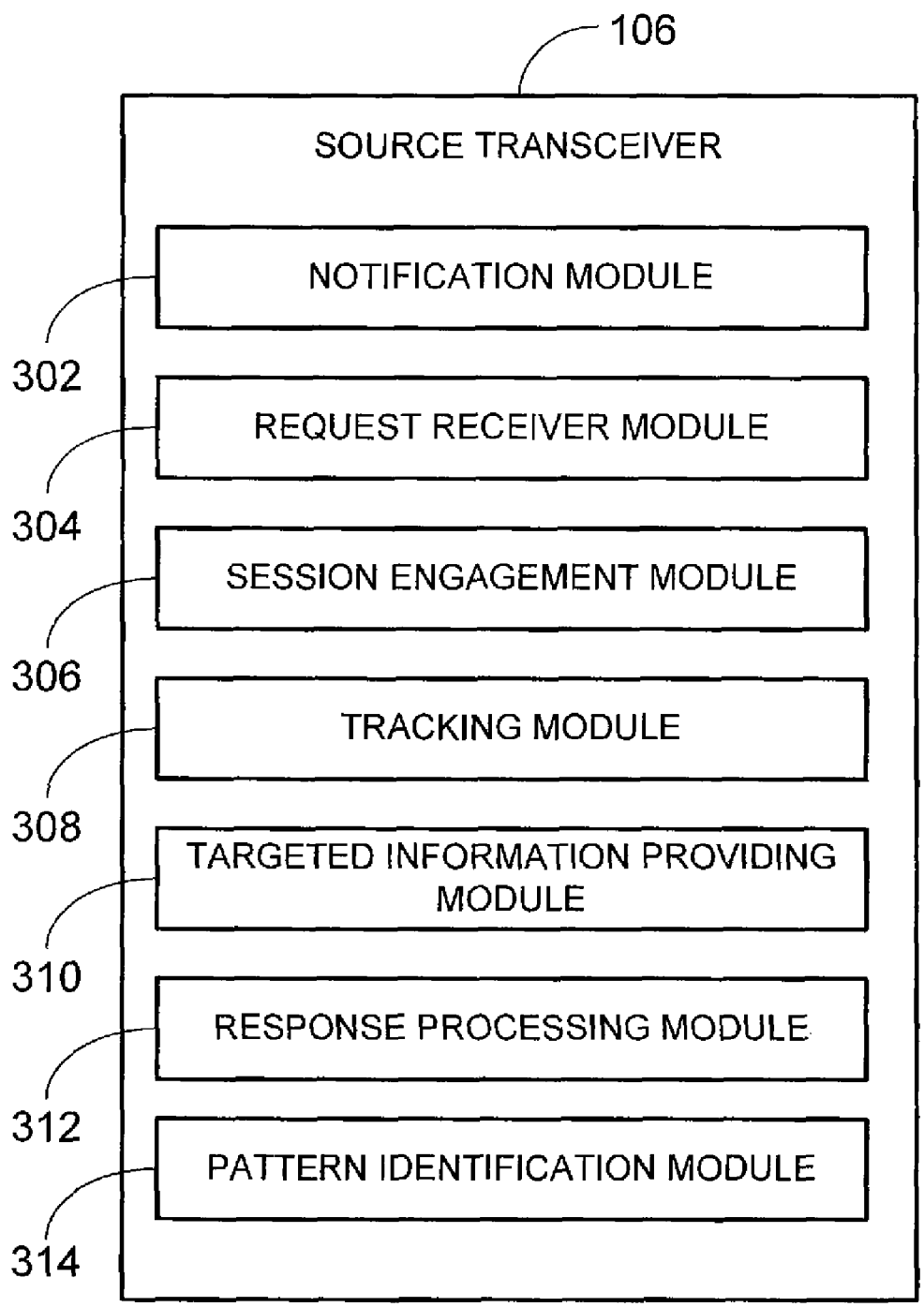
FIG. 3 is a block diagram of an example source transceiver.

FIG. 3 illustrates an example source transceiver 106 (see FIG. 1) that may be deployed in the system 100 or another system. The source transceiver 106 may include a notification module 302, a request receiver module 304, a session engagement module 306, a tracking module 308, a targeted information providing module 310, a response processing module 312, and/or a pattern identification module 314. Other modules may also be used.

The notification module 302 is configured to notifying the wireless device 102 (see FIG. 1) of availability of a wireless data communication session. The request receiver module 304 is configured to receive a request to engage in a wireless data communication session with the wireless device 102. The session engagement module 306 is configured to engage in the wireless data communication session with the wireless device 102 in a local geographic region 108 (see FIG. 1).

The session engagement module 306 may optionally be enabled with different security levels. The most permissive security level may allow all requested engagements to occur, while an intermediate security levels may allow some of the requested engagements to automatically occur. For example, a preprogrammed information supplier may be automatically be granted an information exchange at the intermediate security level. The session engagement module 306 may store an approval list of information suppliers. Other suppliers may be certified by a third party certification procedure with electronic certificate. A highest security level would require a user to approve each session engagement by the session engagement module 306.

Figure 4:
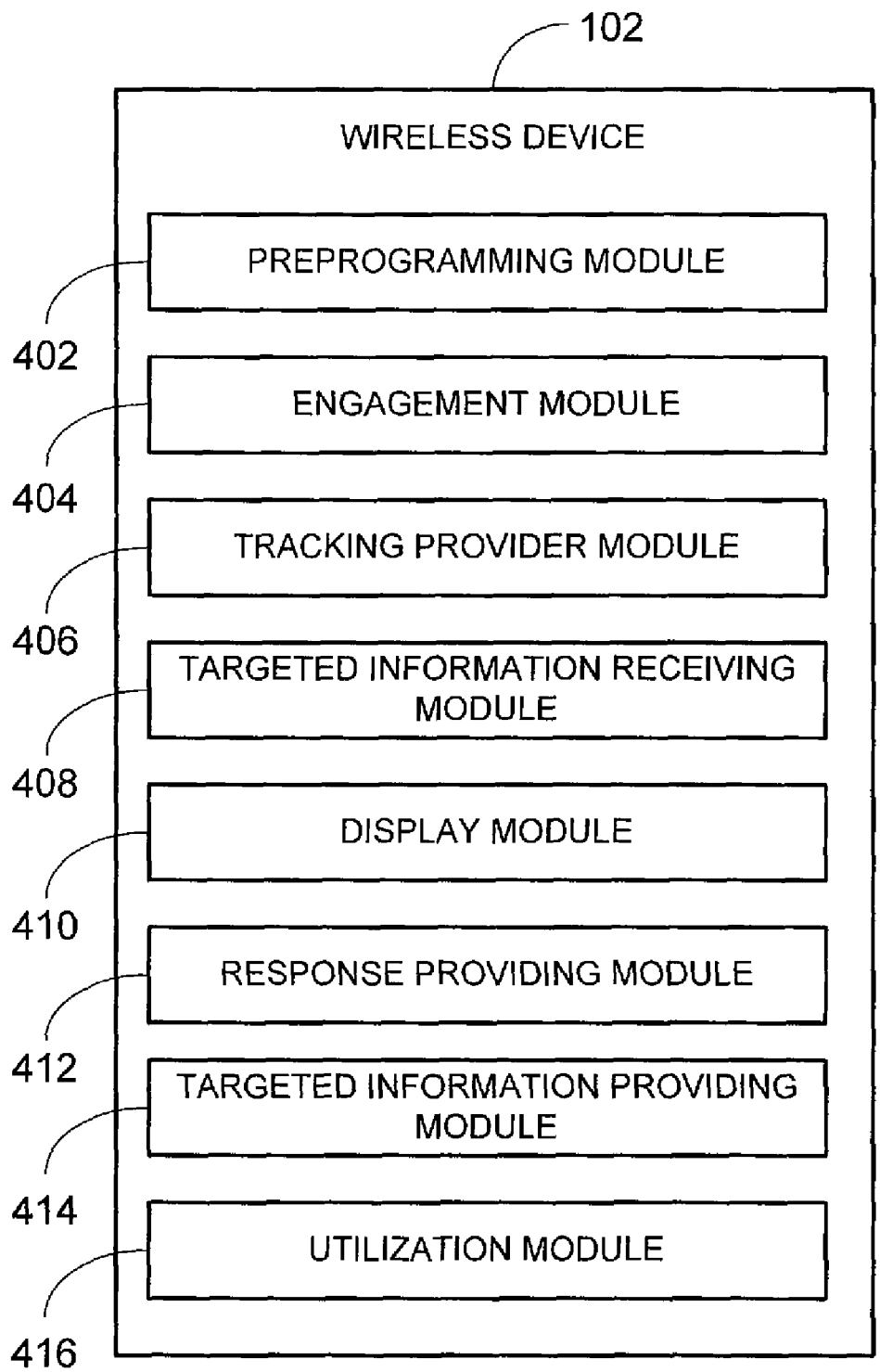
FIGS. 4 & 5 are block diagrams of example wireless devices.

The tracking module 308 is configured to track the wireless device 102 within the local geographic region 108. The targeted information providing module 310 is configured to provide targeted information to the wireless device 102 regarding the local geographic region 108 based on the tracking of the wireless device 102. The response processing module 312 is configured to provide a response to receiving the targeted information. The pattern identification module 314 is configured to identify a pattern of the wireless device in the local geographic region during the wireless data communication session based on the tracking FIG. 4 illustrates an example wireless device 102 (see FIG. 1) that may be deployed in the system 100 or another system. The wireless device 102 may include a preprogramming module 402, an engagement module 404, a tracking provider module 406, a targeted information receiving module 408, a display module 410, a response providing module 412, a targeted information providing module 414, and/or a utilization module 416. Other modules may also be used.

The preprogramming module 402 is configured to preprogram for engagement in a wireless data communication session in the local geographic region 108. The engagement module 404 is configured to engage in a wireless data communication session in the local geographic region 108 with the source transceiver 106.

The tracking provider module 406 is configured to provide tracking information to the source transceiver 106 while in the local geographic region 108.

The targeted information receiving module 408 is configured to receiving targeted information for the wireless device 102 regarding the local geographic region 108 based on the tracking of the wireless device 102. The display module 410 is configured to display the targeted information on the wireless device 102. The response providing module 412 is configured to provide a response to the targeted information.

The targeted information providing module 414 is configured to providing the targeted information to the central server 120 to receive a value regarding the targeted information from the central server 120. The utilization module 416 is configured to utilizing the targeted information on the wireless device 102.

Figure 5:
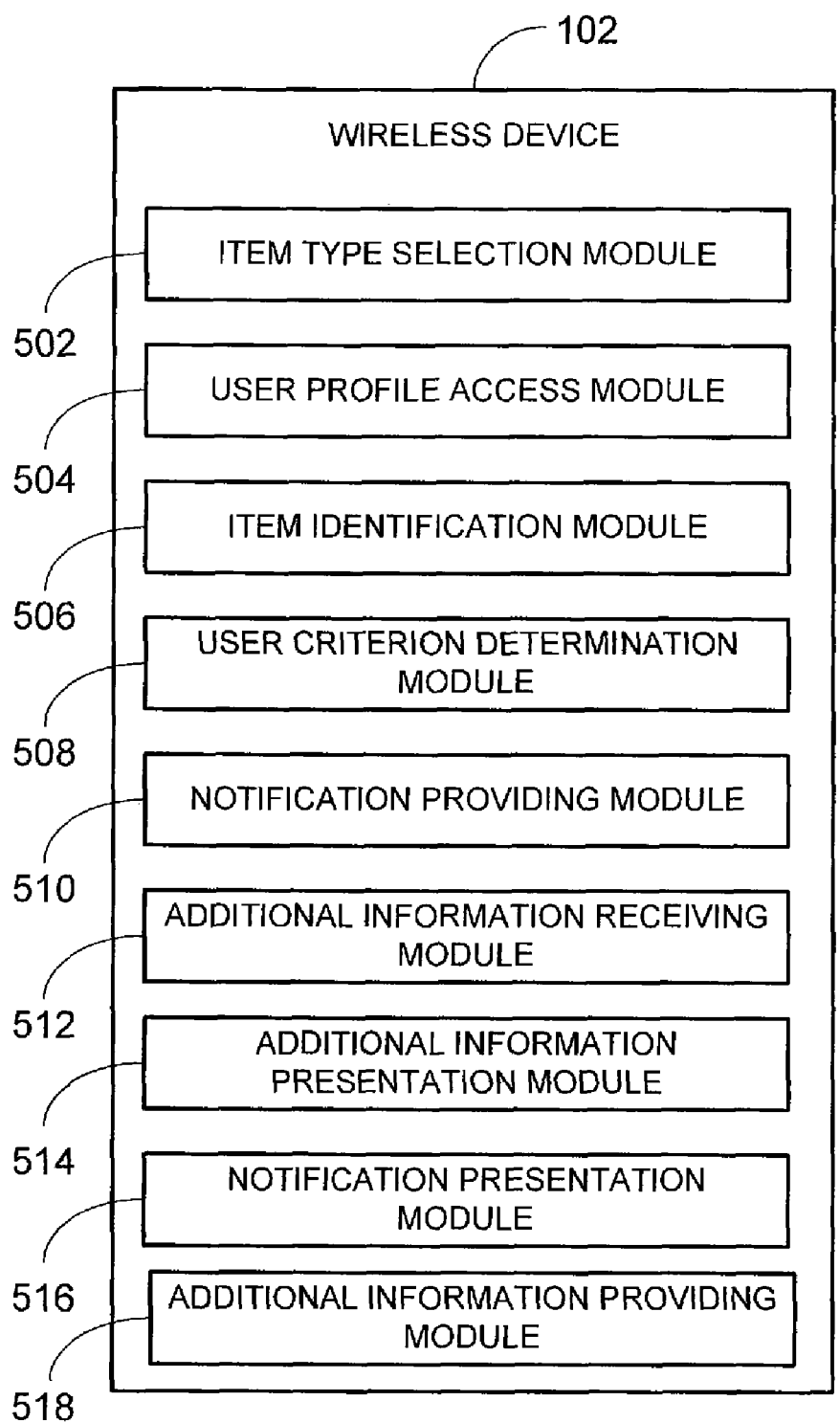

FIG. 5 illustrates an example wireless device 102 (see FIG. 1) that may be deployed in the system 100 or another system. The wireless device 102 may include an item type selection module 502, a user profile access module 504, an item identification module 506, a user criterion determination module 508, a notification providing module 510, an additional information receiving module 512, an addition information presentation module 514, a notification presentation module 516, and/or an additional information providing module 518. Other modules may also be used.

The item type selection module 502 is configured to select an item type for an availability determination. The user profile access module 504 is configured to access a user profile 112, 116 (see FIG. 1) including a user criterion for an item type. The item identification module 506 is configured to wirelessly obtain from a plurality of items 110 of the item type a plurality of item identifications.

The user criterion determination module 508 is configured to determine whether at least one item of the plurality of items 110 meets the user criterion based on the plurality of item identifications. The notification providing module 510 is configured to present a notification regarding the determination of whether at least one item of the plurality of items 110 meets the user criterion.

The additional information receiving module 512 is configured to receive additional information from the central server 120. The addition information presentation module 514 is configured to present the additional information received from the central server 120.

The notification presentation module 516 is configured to present the notification and the additional information regarding the at least one item. The additional information providing module 518 is configured to provide the additional information to the fulfillment server 122.

Figure 6:
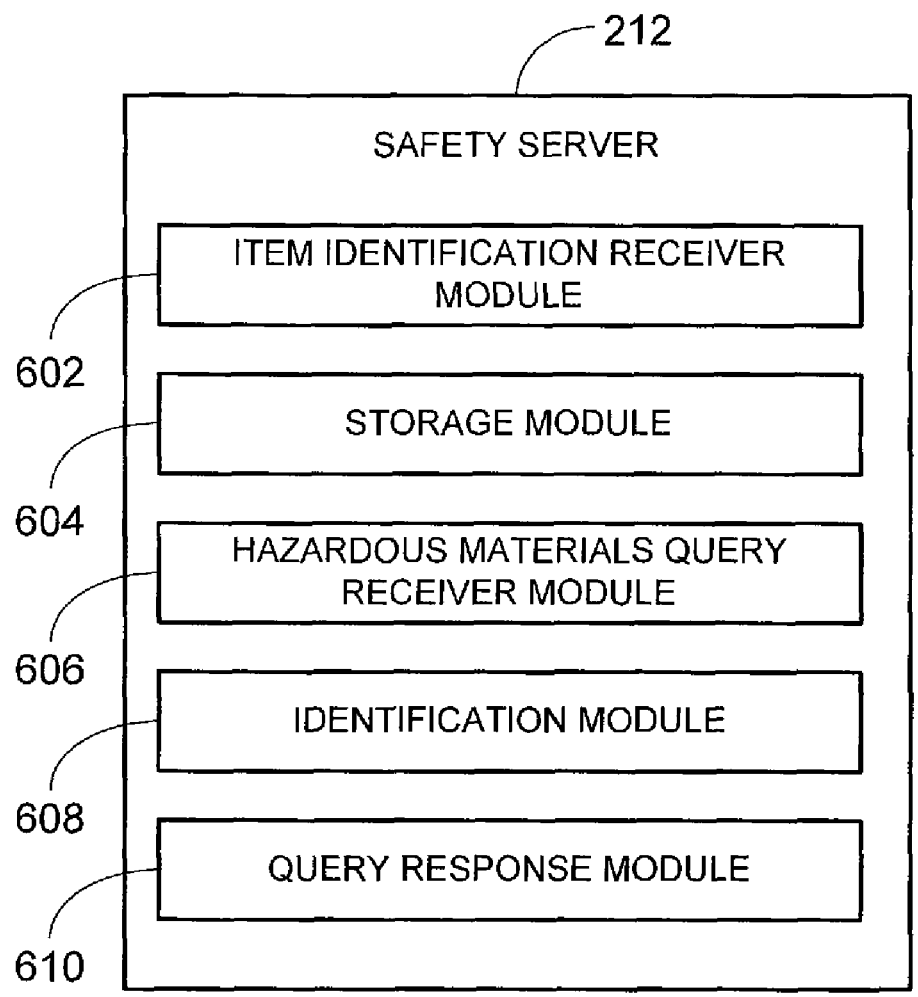
FIG. 6 is a block diagram of an example safety server.

FIG. 6 illustrates an example embodiment of the safety server 212 (see FIG. 2) that may be deployed in the system 200 or another system. The safety server 212 may include an item identification receiver module 602, a storage module 604, a hazardous materials query receiver module 606, an identification module 608, and/or a query response module 610. Other modules may also be used.

The item identification receiver module 602 is configured to wirelessly receive a plurality of item identifications from a plurality of hazardous materials 210 in a plurality of defined areas 206. The storage module 604 is configured to store the plurality of item identifications for the plurality of hazardous materials 210 and a location of the plurality of hazardous materials 210 within the plurality of defined areas 206.

The hazardous materials query receiver module 606 is configured to receive a hazardous materials query. The identification module 608 is configured to identify at least one item identification from the plurality of hazardous materials 210 related to the hazardous materials query. The query response module 610 is configured to respond to the hazardous materials query with the at least one item identification.

Figure 7:
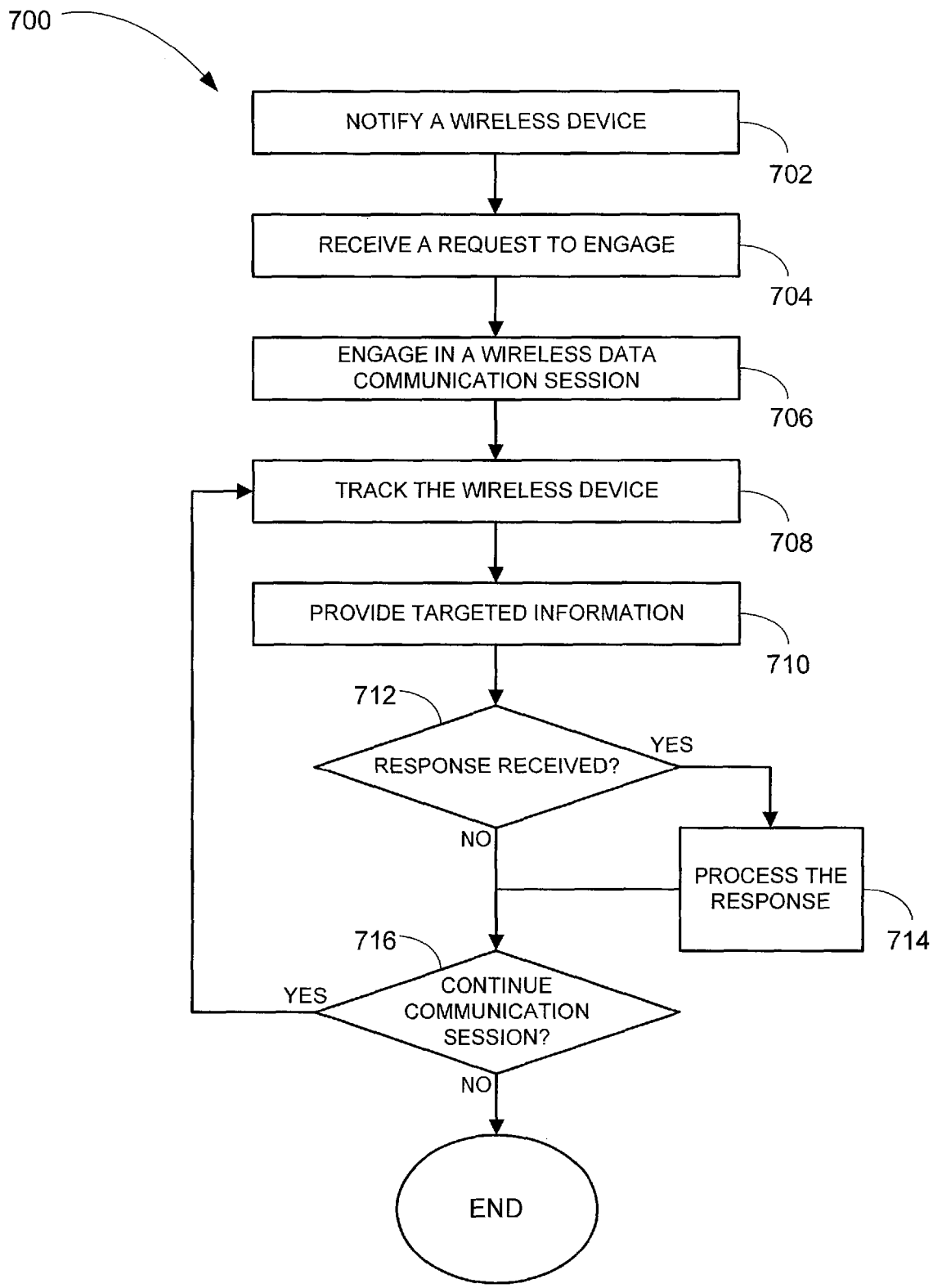
FIG. 7 is a flowchart illustrating a method in accordance with an example embodiment for communicating with a wireless device.

FIG. 7 illustrates a method 700 for communicating with a wireless device 102 according to an example embodiment. The method 700 may be performed by the source transceiver 106 (see FIG. 1) or another device.

The wireless device 102 may be notified of availability of a wireless data communication session at block 702. The wireless data communication session may be a BLUETOOTH wireless data communication session, a WiFi wireless data communication session, or the like. For example, the wireless device 102 may be notified of the availability of the wireless data communication session by a BLUETOOTH inquiry procedure or other synchronization procedure. The notification may occur automatically when a user enters the local geographic region 108, or may be provided in response to a user request for information when located in the wireless range of the source transceiver 106 (see FIG. 1).

A request to engage in a wireless data communication session with the wireless device 102 may be received at block 704. An engagement with the wireless device 102 in a wireless data communication session in the local geographic region 108 may be made at block 706. Information from the local user profile 112 and/or the remote user profile 116 (see FIG. 1) regarding the user of the wireless device 102 may optionally be received.

The wireless device 102 may be tracked within the local geographic region 108 at block 708 to collect tracking information. The tracking information collected may include duration of the wireless device 102 within the local geographic region 108 and/or a plurality of locations of the wireless device 102 within the local geographic region 108. Other types of tracking information may additionally or alternatively be collected. By way of an example, the tracking of the wireless device 102 may be used to determine a pattern of the user in the local geographic region 108. The pattern may include, by way of example, a series of waypoints within the local geographic location 108 in which the wireless device has moved.

In an example embodiment, the tracking information used to determine the pattern may include location data such as GPS data, GPRS data, wave point data, and/or triangulation data. Other location data may also be collected as tracking information.

Targeted information may be provided to the wireless device 102 regarding the local geographic region 108 based on the tracking of the wireless device 102 at block 710. The targeted information may be in textual, audio, and/or visual form and may be in the form of one or more web pages. The targeted information may be provided automatically in the local geographic region 108 or in response to a request from an operator of the wireless device 102 for the targeted information.

The targeted information may include product information, promotional information, location information, survey information, safety information, and/or vehicle information targeted to the user of the wireless device 102. Other types of information may also be used.

The targeted information may include product information regarding a product in the local geographic region 108, a competing product to the product in the local geographic region 108, or a related product to the product (e.g. a speaker wire for a speaker) in the local geographic region 108. The product information may include product specifications (e.g., dimensions, materials, country of manufacture, or a model number), warranty information, place of manufacture, reviews, product ratings, product safety information, product availability, product price, and the like. The product information may enable a user of the wireless device 102 to research a product and/or competing products. By way of an example, the user may request information regarding a number of televisions in a particular local geographic region 108. The targeted information may include pricing and reviews for the televisions located in the local geographic region 108.

In an example embodiment, the product information may be used to download additional information from a third party site. For example, the additional information may include pricing and reviews for a product, while the product information may include information used to obtain the additional information from the third party site.

The targeted information may include promotional information including, by way of example, an electronic coupon, an entry into a raffle, a sales announcement, or the like. For example, the electronic coupon may be directly redeemable with the wireless device 102 and/or manually through use of a code word.

The targeted information may include location information regarding an artist in the local geographic region 108, a particular aspect of an exhibit in the local geographic region 108 (e.g., an art museum), animals in the local geographic region 108 (e.g., a zoo or farm), the location of an item in the local geographic region 108 (e.g., a store), and the like. When provided to the wireless device 102, the location information may extend a user's experience with the local geographic region 108.

The targeted information may include survey information used to identify the user of the wireless device 102 for purposes of completing a survey regarding a user experience while the user was in the local geographic region 108.

The targeted information may include safety information. For example, the safety information may include the location of exit signs and stairs, site hazmat info, hose hookups, fire hydrants, and the like. The safety information may specifically identify items in the local geographic region 108, or may provide a general indication such as a warning about not entering a certain region. The safety information may include information taken from a blueprint including building layout, a shelter for a catastrophic event, a region with access problems, and the like. The safety information may be used by firemen, hazmat inspectors, and others to expedite resolution of a problem by avoiding problem regions and/or quickly receive information regarding items within the local geographic region 108.

The vehicle information may include road conditions, traffic signal state, gas station information, or other automotive-related information.

In an example embodiment, a pattern of the wireless device 102 in the local geographic region 108 may be identified during the wireless data communication session based on the tracking and targeted information may be provided to the wireless device 102 regarding the local geographic region 108 based on the identified pattern. For example, the targeted information may encourage a user to visit an area in the local geographic region 108 that the user has not already visited.

In an example embodiment, the targeted information may be for another local geographic region 108 to encourage the user to redeem a coupon at a competitor's store. The targeted information may then be used to acquire business that might otherwise be provided to a competitor.

In an example embodiment, the targeted information may be based on the direction of movement of the wireless device 102. The wireless device 102 may travel through a plurality of local geographic regions 108. A prediction is made as to the next local geographic region 108 where the wireless device 102 will enter. Data relating to the predicted geographic region 108 may be preloaded to the wireless device 102 prior to arrival in the predicted geographic region 108. The targeted information in this example embodiment may be usefully when the wireless device 102 is travelling on a roadway or expressway, or on mass transit (e.g., train, subway, bus, and the like). Preloading the data on the wireless device 102 may allow the data to be displayed in a timely manner to the user. That is, the data may be displayed by the wireless device 102 just before or when the user can use the data.

At decision block 712, a determination may be made as to whether a response from providing the tracking information has been received from the wireless device 102. If a determination is made that the response has been received, the response may be processed at block 714. For example, the response may be a request by the user of the wireless device 102 to provide details of the user, to "opt in" to a raffle, and the like. In an example embodiment, the user can "opt out" of select requests. If a determination is made at decision block 712 that a response has not been received or upon completion of the operations at block 714, the method 700 may proceed to decision block 716.

A determination may be made at decision block 716 whether to continue the communication session. If a determination is made to continue the communication session, the method 700 may return to block 708. If a determination is made not to continue to the communication session, the method 700 may terminate.

In an example embodiment, the method 700 may be used to track shopping habits based on a report of shopper's location and/or duration in the local geographic region 108 (e.g., a store). By way of an example, a user with the wireless device 102 may be provided with music samples, deals, and the like upon entering a store and/or browsing the store.

Figure 8:
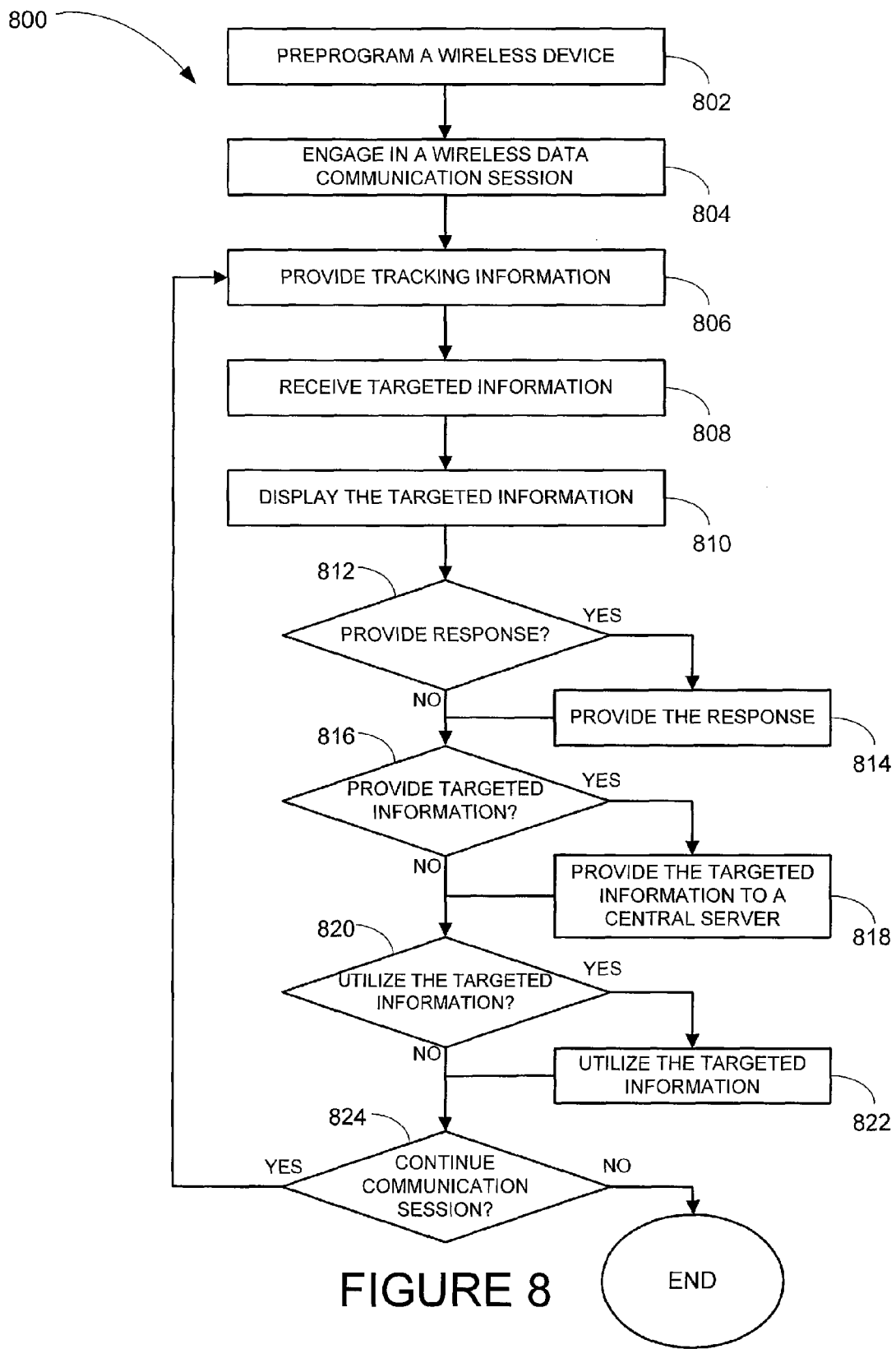
FIG. 8 is a flowchart illustrating a method in accordance with an example embodiment for communicating with a source transceiver.

FIG. 8 illustrates a method 800 for communicating with a source transceiver 106 (see FIG. 1) according to an example embodiment. The method 800 may be performed by the wireless device 102 (see FIG. 1) or another device.

The wireless device 102 may be preprogrammed to engage in a wireless data communication session in the local geographic region 108 at block 802. The preprogramming may include software, hardware, and/or firmware that have been provided to the wireless device 102 to enable the wireless device 102 to participate in the wireless data communication session in the local geographic region 108. The preprogramming may optionally record data regarding the user in the local user profile 112 on the wireless device 102 and/or register the wireless device 102 to participate in a wireless data communication session.

An engagement in the wireless data communication session between the wireless device 102 and the source transceiver 106 in the local geographic region 108 may be made at block 804. The engagement may be made automatically, or based on a request or an acceptance of the request by the user of the wireless device 102.

Tracking information may be provided to the source transceiver 106 while in the local geographic region 108 at block 806. Targeted information for the wireless device 102 regarding the local geographic region 108 based on the tracking of the wireless device 102 may be received at block 808.

The targeted information may be available on the wireless device 102 for a limited time (e.g., minutes or based on an occurrence such as leaving the store) or until deleted by the user. For example, the targeted information may be provided so that the user does not leave the local geographic region 108 while maintaining the targeted information.

The targeted information may be displayed on the wireless device 102 at block 810. The targeted information may optionally be displayed with related information 118 to the targeted information. For example, if the targeted information identifies a particular item, the related information 118 may be received from the database 114 (e.g., through the central server 120) to identify places where the item may be purchased, information about the company, and the like.

A determination may be made at decision block 812 whether to provide a response. If a determination is made to provide a response, the response to the targeted information may be provided at block 814. The response may be provided to the source transceiver 106 and/or the central server 120. If a determination is made not to provide a response at decision block 812 or upon completion of the operations at block 814, the method 800 may proceed to decision block 816.

At decision block 816, a determination may be made whether to provide the targeted information. If a determination is made to provide the targeted information, the targeted information may be provided to the central server 120 and/or the fulfillment center at block 818. By providing the targeted information, the user of the device may be entitled to a value related to the targeted information (e.g., a discount, admission, or other thing of value). If a determination is made not to provide the targeted information at decision block 816 or upon completion of the operations at block 818, the method 800 may proceed to decision block 820.

A determination may be made at decision block 820 whether to utilize the targeted information. If a determination is made to utilize the targeted information, the targeted information may be utilized on the wireless device 102 at block 822. For example, the wireless device 102 may receive road condition information and adjust one or more vehicle variables in response to the road condition information. The vehicle variables may include, by way of example, traction, suspension, and/or breaking system variables. If a determination is made at decision block 818 not to utilize the targeted information or upon completion of the operations at block 822, the method 800 may proceed to decision block 824.

In an example embodiment, the targeted information may include contact information for roadside assistance such that the data is loaded in the wireless device 102 prior to a need for this data. The roadside assistance data may be updated based on location of the wireless device 102 and availability and/or location of the assistance of the wireless device 102.

At decision block 824, a determination may be made whether to continue the communication session. If a determination is made to continue the communication session, the method 800 may return to block 806. If a determination is made at decision block 824 not to continue the communication session, the method 800 may terminate.

In an example embodiment, the operations at decision blocks 812, 816, 820 may occur in any order.

In an example embodiment, the targeted information may be maintained on the wireless device 102 while the user is in the local geographic region 108 and erased when the wireless device 102 is no longer in the local geographic region 108. The user may then have an incentive to use the targeted information (e.g., an electronic coupon) before leaving the local geographic region 108, thereby driving the user to make a more immediate purchase.

Figure 9:
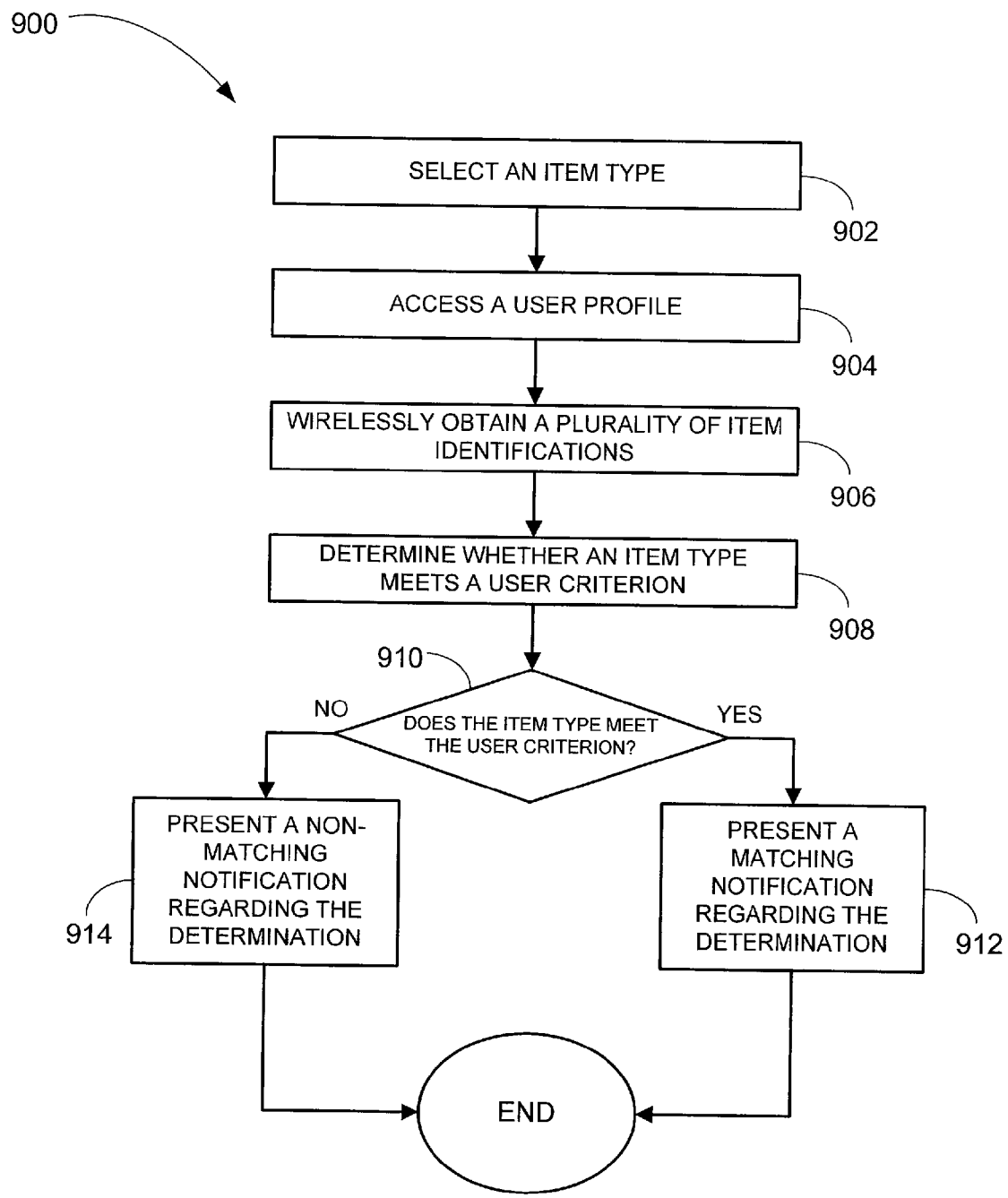
FIG. 9 is a flowchart illustrating a method in accordance with an example embodiment for determining item availability.

FIG. 9 illustrates a method 900 for determining item availability according to an example embodiment. The method 900 may be performed by the wireless device 102 (see FIG. 1) or another device.

An item type may optionally be selected (e.g., by the user) for an availability determination at block 902. The selection may enable the wireless device 102 to receive item identifications of a particular type. When an item type is not selected by the user, default item identification may be used.

A user criterion may be accessed from a user profile 112, 116 at block 904. For example, the local user profile 112 may be accessed on the wireless device 102 and/or the remote user profile 116 may be accessed from the database 114.

A plurality of item identifications may be wirelessly obtained from the plurality of items 110 (see FIG. 1) of the item type in the local geographic region 108 at block 906. For example, the item identifications may be obtained from radio frequency identification (RFID) chips associated with the plurality of items 110.

A determination may be made at decision block 908 as to whether at least one item of the plurality of items 110 meets the user criterion based on the plurality of item identifications. If a determination is made that at least one item meets the user criterion, a matching notification regarding the determination of whether the at least one item of the plurality of items meets the user criterion may be presented at block 910. The matching notification may identify the items matching the user criterion in the user profile 112, 116. If a determination is made that at least one item does not meet the user criterion, a non-matching notification regarding the determination of whether the at least one item of the plurality of items 110 meets the user criterion may be presented at block 912. Upon completion of the operations at block 910 or block 912, the method 900 may terminate.

In an example embodiment, the user profile 112, 116 may include a body type analysis from sensors (e.g., as detected using a body suit with sensors) and/or an electronic photo of the user. The notification may include a photo of the item appearing on the user in accordance with the sensor information. The notification may indicate whether colors for a certain selection of items match. The sensors may provide a wireframe body image to be overlaid by product lines that optionally show the product lines on the user.

Figure 10:
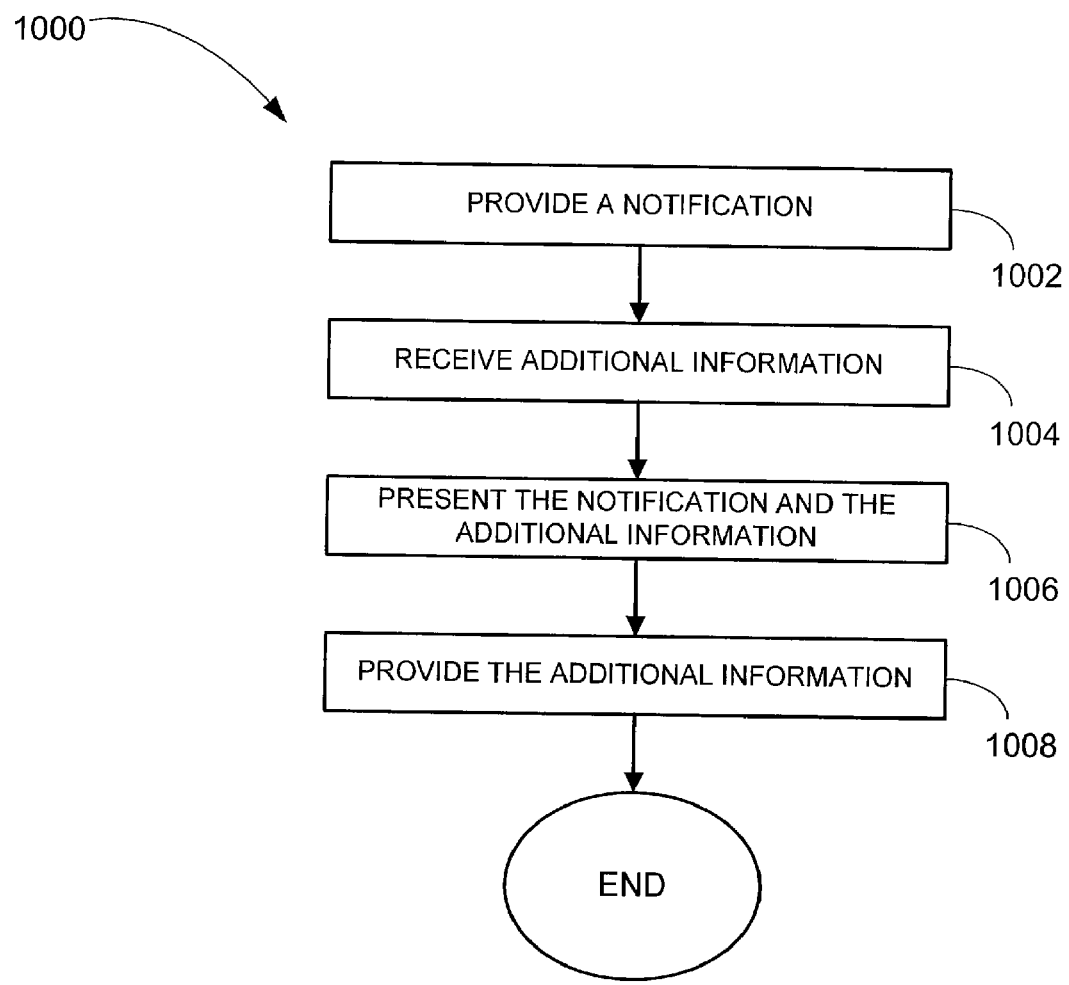
FIG. 10 is a flowchart illustrating a method in accordance with an example embodiment for providing a matching notification.

FIG. 10 illustrates a method for providing a matching notification according to an example embodiment. In an example embodiment, the method 1000 may be performed at block 910 (see FIG. 9).

A notification regarding the determination of whether the at least one item of the plurality of items 110 meets the user criterion may be provided to the central server 120 (see FIG. 1) at block 1002.

Additional information may be received from the central server 120 at block 1004. The additional information may include a price of an item, dimensions of an item, an electronic coupon for an item, an electronic coupon for a different item, product information for an item, identification of one or more related items to the item, and the like.

The notification and the additional information regarding the at least one item may be presented on the wireless device 102 at block 1006.

The additional information may be provided to the fulfillment server 122 (see FIG. 1) at block 1008 at or before checkout. Checkout may occur automatically when a user leaves the local geographic region 108 or another designate region, or may occur when a user visits an operator of a cash register. For example, the automatic checkout may occur by comparing an RFID with a SIM chip signature inside the wireless device 102 to determine whether a discount should be applied.

Figure 11:
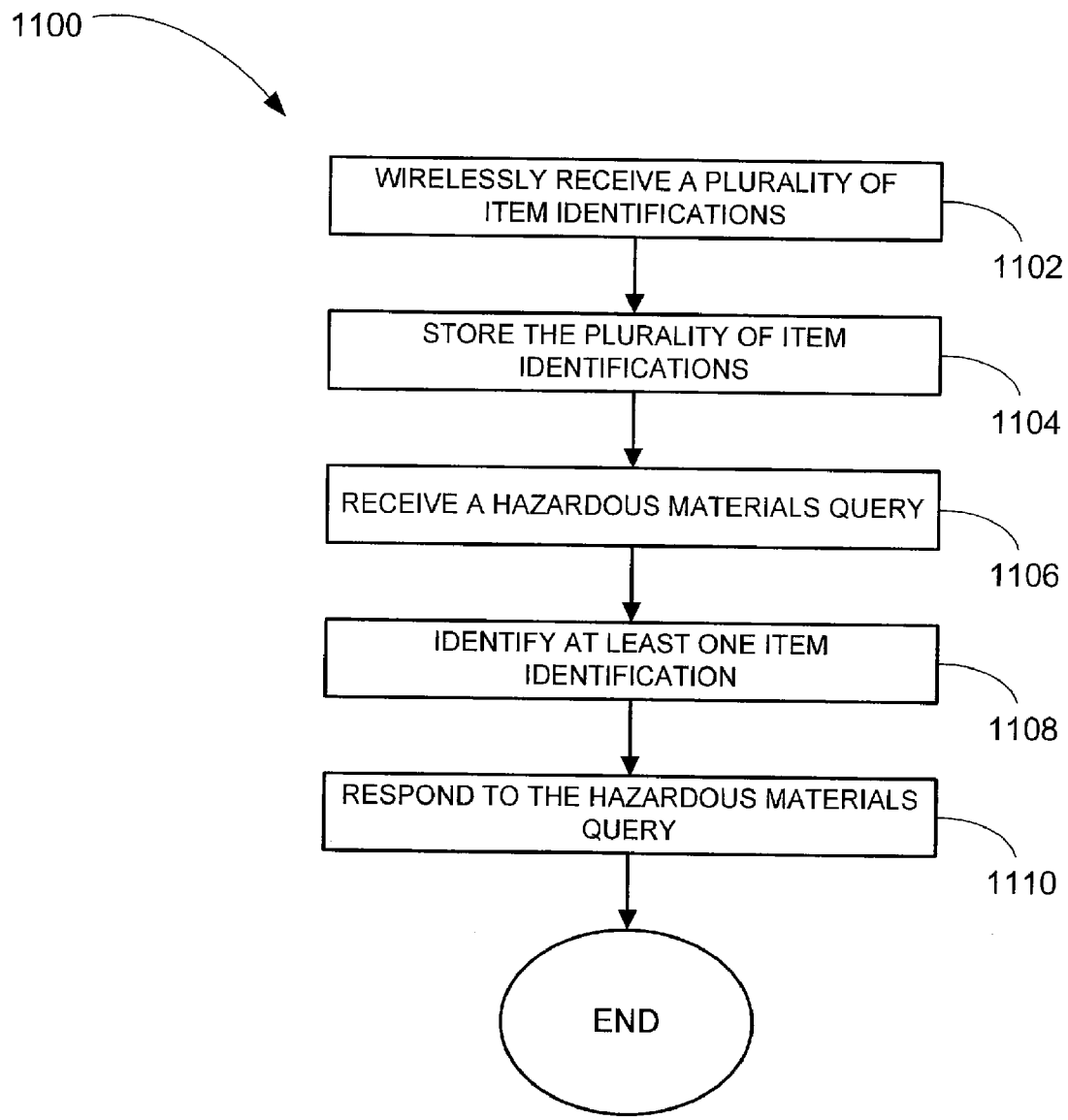
FIG. 11 is a flowchart illustrating a method in accordance with an example embodiment for processing a hazardous materials query.

FIG. 11 illustrates a method 1100 for processing a hazardous materials query according to an example embodiment. The method 1100 may be performed by the safety server 212 (see FIG. 2) or another device or server.

A plurality of item identifications of the plurality of hazardous materials 210 in the plurality of defined areas 206 may be wirelessly received at block 1102.

The plurality of item identifications for the plurality of hazardous materials 210 and a location of the plurality of hazardous materials in the plurality of defined areas 206 may optionally be stored as the hazardous information 216 in the database 214 at block 1104.

A hazardous materials query may be received from the safety device 202 at block 1106. The hazardous materials query may include a selected type of hazardous material and/or a selected area from the plurality of defined areas 206.

At least one item identification may be identified from the plurality of hazardous materials related to the hazardous materials query at block 1108.

A response to the hazardous materials query with the at least one item identification may be made at block 1110.

In an example embodiment, a response to the hazardous materials query may include at least one item identification from the plurality of hazardous materials 210 and additional information related to the hazardous materials query. The additional information may include a location for the at least one item identification in the plurality of defined areas 210, a route to the at least one item identification in the plurality of defined areas 210, safety information for the at least one item identification in the plurality of defined areas 210, or the like. The response may also include a state of the hazardous material.

Figure 12:
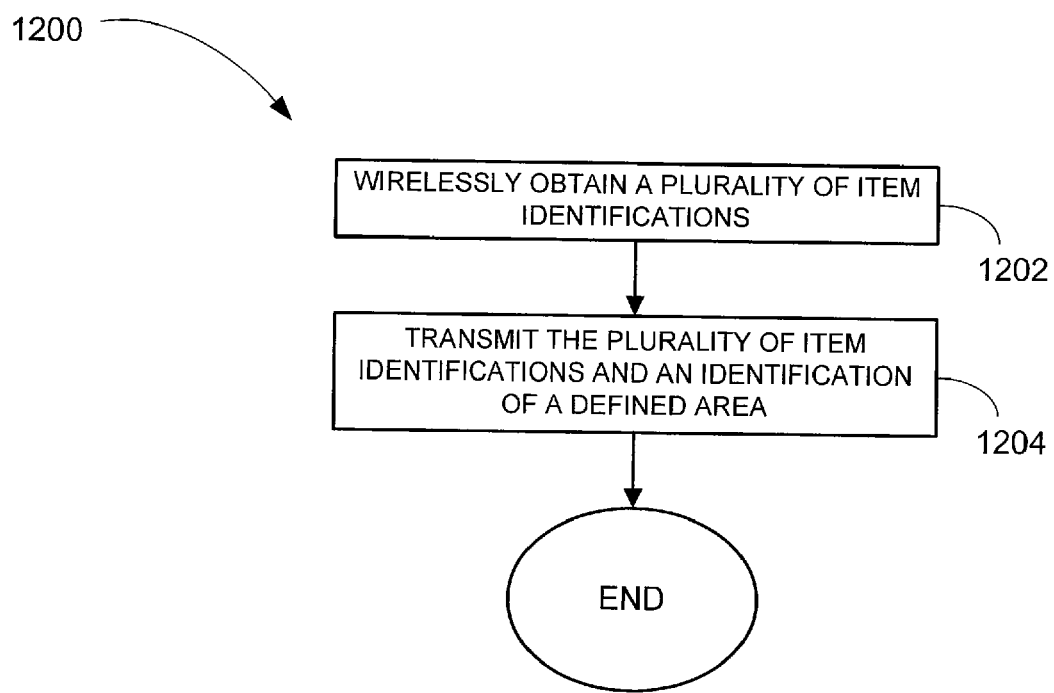
FIG. 12 is a flowchart illustrating a method in accordance with an example embodiment for managing a plurality of hazardous materials.

FIG. 12 illustrates a method 1200 for managing a plurality of hazardous materials 210 (see FIG. 2). The method 1200 may be performed by the collection device 208 or another device.

A plurality of item identifications may be wirelessly obtained from a plurality of hazardous materials 210 in a defined area 206 at block 1202. Each of the plurality of hazardous materials 210 may have a separate transmitter, or one or more transmitters may be used for the plurality of hazardous materials 210.

The plurality of item identifications and an identification of the defined area 206 may be transmitted to the safety server 212 (see FIG. 2) at block 1204. The plurality of item identifications and the identification may be in the form of an electronic log of the hazardous materials.

In an example embodiment, the method 1200 may enable a dynamic audit of the defined area.

Figure 13:
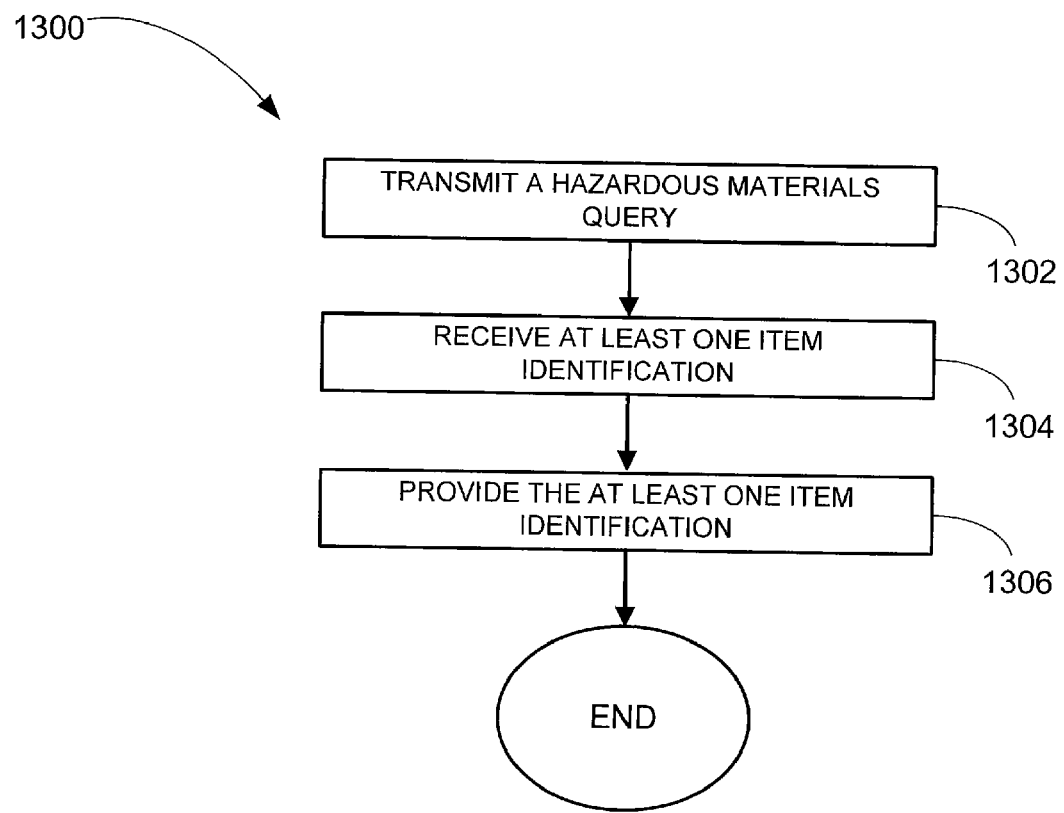
FIG. 13 is a flowchart illustrating a method in accordance with an example embodiment for operating a safety device.

FIG. 13 illustrates a method 1300 for operating the safety device 202 (see FIG. 2).

A hazardous materials query may be transmitted at block 1302. The hazardous materials query may include a hazardous material and/or a defined area.

At least one item identification of a hazardous material may be received in response to the hazardous materials query at block 1304.

The at least one item identification of the hazardous material may be provided to the operator of the safety device 202 at block 1306. The at least one item identification may be provided visually, audibly, or otherwise. For example, the at least one item identification may be provided on a visual display on the safety device 202.

In an example embodiment, the method 1300 may be used to identify the location of the plurality of hazardous materials 210 in a smoked-filled room. The use of the method 1300 may enable a rescue worker to more safely enter a defined area 206 for rescue while avoiding areas and/or items of concern.

Figure 14:
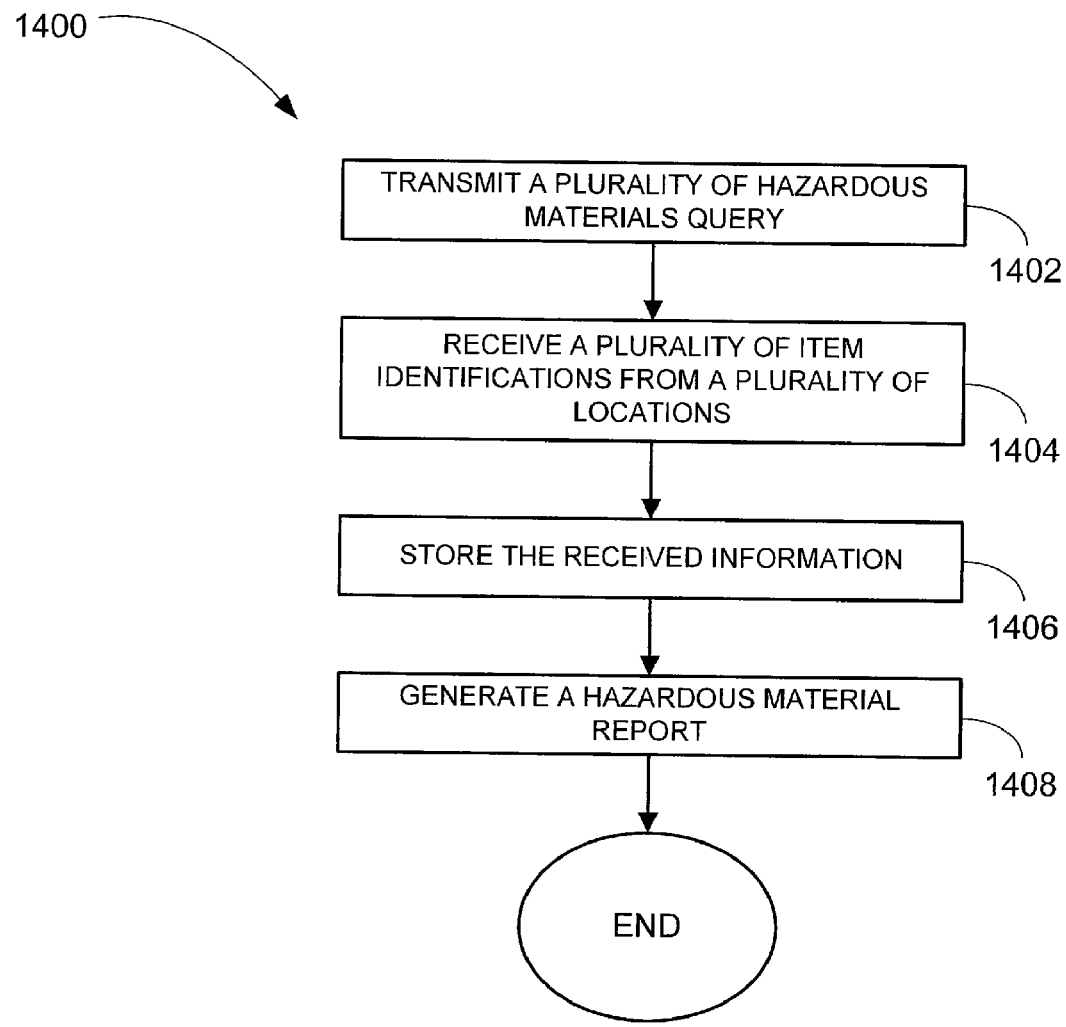
FIG. 14 is a flowchart illustrating a method in accordance with an example embodiment for generating a hazardous materials report.

FIG. 14 illustrates a method 1400 for generating a hazardous materials report. The method 1400 may be performed by the safety server 212 (see FIG. 2).

A plurality of hazardous material queries may be transmitted at block 1402.

A plurality of item identifications may be received in response to the plurality of hazardous material queries at block 1404.

The received information may optionally be stored in the database 214 as the hazardous information 216 at block 1406.

A hazardous material report may be generated at block 1408. The hazardous material report may identify the locations and may be used by safety personnel (e.g., a hostage rescue team, an emergency services team) prior to entering an area or for purposes of an audit.

In an example embodiment, the method 1400 may be performed by city personnel, an auditor, regulatory personnel, law enforcement personnel, safety personnel, or the like to determine an amount and location of the plurality of hazardous materials 214 in the plurality of defined areas 206.

Figure 15:
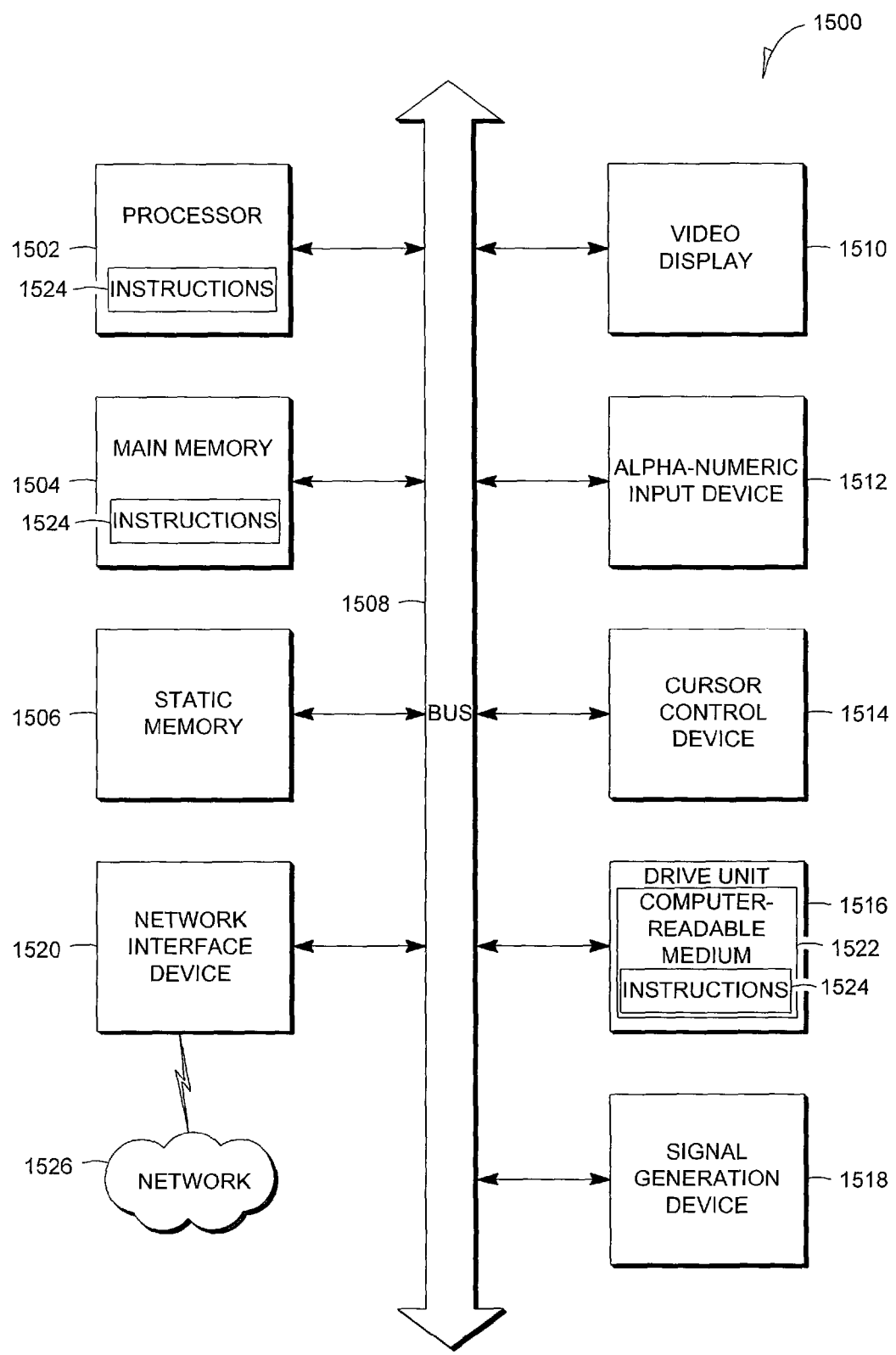
FIG. 15 illustrates a diagrammatic representation of machine in the example form of a computer system within which a set of instructions, for causing the machine to perform any one or more of the methodologies discussed herein, may be executed.

FIG. 15 shows a diagrammatic representation of machine in the form of a computer system 1500 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a car audio device, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The processor 1502 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1502 may execute instructions and includes that portion of the computer system 1500 that controls the operation of the entire computer system 1500.

The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1518 (e.g., a speaker) and a network interface device 1520.

The cursor control device 1514 may be a keyboard, mouse or other pointing device, trackball, touchpad, touch screen, keypad, microphone, voice recognition device, or any other appropriate mechanism for the user to input data to the computer 1500 and manipulate the user interface previously discussed. Although only one input device 1514 is shown, in another embodiment any number and type of input devices may be present.

The disk drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520. The network 1526 may be any suitable network and may support any appropriate protocol suitable for communication to the computer system 1500. In an embodiment, the network 1526 may support wireless communications. In another embodiment, the network 1526 may support hard-wired communications, such as a telephone line or cable. In another embodiment, the network 1526 may support the Ethernet IEEE (Institute of Electrical and Electronics Engineers) 802.3x specification. In another embodiment, the network 1526 may be the Internet and may support IP (Internet Protocol). In another embodiment, the network 1526 may be a local area network (LAN) or a wide area network (WAN). In another embodiment, the network 1526 may be a hotspot service provider network. In another embodiment, the network 1526 may be an intranet. In another embodiment, the network 1526 may be a GPRS (General Packet Radio Service) network. In another embodiment, the network 1526 may be any appropriate cellular data network or cell-based radio network technology. In another embodiment, the network 1526 may be an IEEE 802.11 wireless network. In still another embodiment, the network 1526 may be any suitable network or combination of networks. Although one network 1526 is shown, in other embodiments any number of networks (of the same or different types) may be present.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 1500 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer system 1500. For example, other peripheral devices such as audio adapters or chip programming devices, such as EPROM (Erasable Programmable Read-Only Memory) programming devices may be used in addition to, or in place of, the hardware already depicted.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable medium comprising instructions, which when executed by a machine, cause the machine to:
   notify a wireless device of availably of a wireless data communication session when a user of the wireless device enters a local geographic region;
   receive an approval from the user to engage in the wireless data communication session with the wireless device;
   engage in the wireless data communication session in the local geographic region with a source transceiver;
   access a user profile of the user of the wireless device, the user profile including a user criterion for an item type and a body type analysis of the user previously detected and stored in the user profile by the user using a body suit with sensors;
   wirelessly obtaining a plurality of item identifications based on a plurality of items of the item type and the body type analysis;
   determine whether at least one item of the plurality of items meets the user criterion based on the plurality of item identifications; and
   present a notification regarding the determination of whether the at least one item of the plurality of items meets the user criterion.

2. The non-transitory machine-readable medium of claim 1, wherein causing the machine to access a user profile causes the machine to:
   select the item type for an availability determination; and
   access the user profile, the user profile including the user criterion for the item type.

3. The non-transitory machine-readable medium of claim 1, wherein causing the machine to present a notification regarding the determination of whether the at least one item of the plurality of items meets the user criterion causes the machine to:
   present a matching notification regarding the determination of whether the at least one item of the plurality of items meets the user criterion.

4. The non-transitory machine-readable medium of claim 1, wherein causing the machine to present a notification regarding the determination of whether the at least one item of the plurality of items meets the user criterion causes the machine to:
   present a non-matching notification regarding the determination of whether the at least one item of the plurality of items meets the user criterion.

5. The non-transitory machine-readable medium of claim 1, wherein causing the machine to present a notification regarding the determination of whether the at least one item of the plurality of items meets the user criterion causes the machine to:
   provide a notification regarding the determination of whether the at least one item of the plurality of items meets the user criterion to a central server;
   receive additional information from the central server; and
   present the notification and the additional information regarding the at least one item.

6. The non-transitory machine-readable medium of claim 1, further comprising instructions that cause the machine to:
   provide the additional information to a fulfillment server.

* * * * *